(12) United States Patent
Ibarra et al.

(10) Patent No.: US 12,708,107 B2
(45) Date of Patent: Aug. 18, 2026

(54) PROCESS AND FACILITY FOR REGULATING THE AMOUNT OF OXYGEN SUPPLIED TO ANIMAL DRINKING WATER

(71) Applicant: L'Air Liquide, Société Anonyme pour l'Etude et l'Exploitation des Procédés Georges Claude, Paris (FR)

(72) Inventors: Dominique Ibarra, Gif-sur-Yvette (FR); Franck Cousin, Gif-sur-Yvette (FR); Pauline Le Dru, Beaucouzé (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 18/859,098

(22) PCT Filed: Apr. 14, 2023

(86) PCT No.: PCT/EP2023/059760
§ 371 (c)(1),
(2) Date: Oct. 22, 2024

(87) PCT Pub. No.: WO2023/202950
PCT Pub. Date: Oct. 26, 2023

(65) Prior Publication Data

US 2025/0275522 A1 Sep. 4, 2025

(30) Foreign Application Priority Data

Apr. 22, 2022 (FR) ...................................... 2203741

(51) Int. Cl.
*A01K 39/02* (2006.01)
*A01K 7/02* (2006.01)

(52) U.S. Cl.
CPC ................ *A01K 39/02* (2013.01); *A01K 7/02* (2013.01)

(58) Field of Classification Search
CPC ............. A01K 39/02; A01K 7/00; A01K 7/02
See application file for complete search history.

(56) References Cited

U.S. PATENT DOCUMENTS 6,063,295 A 5/2000 Williams
2004/0200431 A1* 10/2004 Persinger .............. A61K 45/06 119/651

(Continued)

FOREIGN PATENT DOCUMENTS

FR 3073361 A1 * 5/2019 .......... B01F 23/2362
WO WO-2006073249 A1 * 7/2006 .......... B01F 25/4523
WO WO 2020 138247 7/2020

OTHER PUBLICATIONS

French Search Report for related FR2402047, Nov. 18, 2024.
International Search Report for corresponding PCT/EP2023/059760, Jun. 28, 2023.

*Primary Examiner* — Kristen C Hayes
(74) *Attorney, Agent, or Firm* — Yan Jiang

(57) ABSTRACT

A facility for rearing animals comprises an injector, a water inlet line and a gas inlet line, a source of oxygen, a tank of water at atmospheric pressure; a coil capable of receiving water charged with dissolved oxygen coming from the injector, wherein the water arrives at the coil by virtue of a pump, and the coil creates a water/oxygen contact time; the water coming out of the coil passing through a device so that it is directed in full to the watering zone or else partly to the watering zone and partly to the tank, wherein the facility performs two simultaneous injections of oxygen or of a mixture containing oxygen into the water, one upstream of the pump and the other downstream of the pump, the flow rate of the injection performed upstream being lower than the flow rate performed downstream of the pump.

8 Claims, 1 Drawing Sheet

(56) References Cited

U.S. PATENT DOCUMENTS

2020/0391164 A1* 12/2020 Cousin ................ B01F 23/2362
2025/0276295 A1* 9/2025 Cousin ...................... C02F 1/68

* cited by examiner

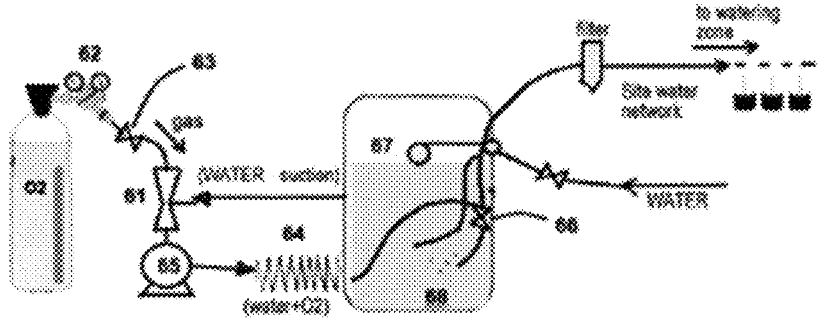
[Fig. 1]
Prior Art
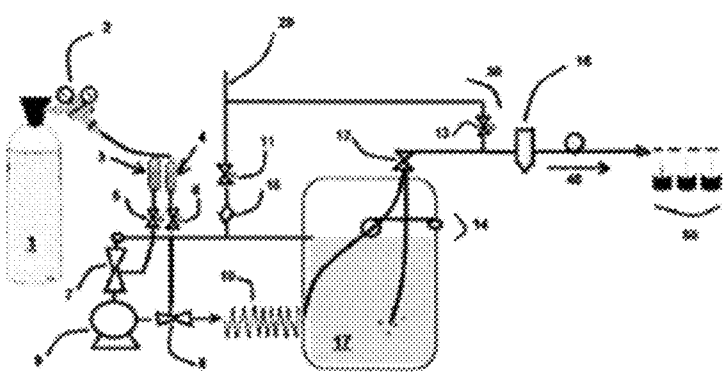
[Fig. 2]

PROCESS AND FACILITY FOR REGULATING THE AMOUNT OF OXYGEN SUPPLIED TO ANIMAL DRINKING WATER

CROSS REFERENCE TO RELATED APPLICATIONS

This application is a 371 of International Application No. PCT/EP2023/059760, filed Apr. 14, 2023, which claims priority to French Patent Application No. 2203741, filed Apr. 22, 2022, the entire contents of which are incorporated herein by reference.

FIELD OF THE INVENTION

The present invention relates to the field of animal rearing, and in particular the rearing of poultry and pigs or also rabbits, and is very particularly concerned with the question of their watering.

BACKGROUND

It should be remembered here, for example, that, for a chicken to reach the weight of 1.5 kg, it took approximately 120 days in 1920, approximately 44 days in 1980 and approximately 33 days only in 1998.

According to various studies, experimental surveys in such farms show that, at the same age (49 days), the average weight of a broiler doubled between 1967 and 1996. Furthermore, in recent years, consumer demand has evolved toward less fatty animals and pre-cut poultry meats.

These production objectives have been achieved thanks to the change in nutritional programs and rearing conditions, associated with the genetic selection of rapid-growth animals, with a low consumption index, low fattening and increased development of the muscle masses.

Genetics, hygiene, prophylaxis and the improvement in rearing conditions have, for the past twenty years, considerably reduced the mortality of poultry on farms.

Nevertheless, it is necessary to take into account the following aspects which appear in all the studies issued on the subject:

- rapid body growth increases oxygen requirements and heat production.
- the increase in the output of pectoral mass accentuates the imbalance between the development of muscle mass and that of other tissues, such as the kidney, heart and lungs. In current farms, the change in the growth characteristics is sometimes accompanied by an increase in the frequency of failures of the cardiovascular and respiratory systems, characterized by an increasing number of "heat strokes", "sudden death" syndromes and ascites (accumulation of fluid in the peritoneal cavity).

The studies available in this area can be summarized by the fact that oxygen is a limiting factor which can help explain the frequency of cardiovascular and respiratory diseases in broilers. Comparison of genotypes having variable growth rates shows that the high incidence of ascites and the high growth rate are associated with a low oxygen pressure and a high $CO_2$ pressure in venous blood. Insufficient oxygen availability thus appears to be a major cause of dysfunction of the cardiovascular and respiratory systems in rapid-growth chickens.

The above demonstrates the need to restore a balance between the metabolic needs imposed by selection for rapid growth and the ability of the respiratory system, which supplies oxygen, to meet them.

One possible approach would be to increase the oxygen content in the environment of the farmed chicken. Unfortunately, intensive farms require strong ventilation in order to evacuate the heat and the humidity produced by the fowls, and thus the oxygen consumption, in order to change from 20.9% to 27%, for example, would be prohibitive and would definitively undermine the solution in economic terms.

The applicant has carried out numerous studies on this question; reference may in particular be made to the document EP-3 709 793 (WO2019097142), which proposed a novel facility for the oxygen-doping of water for watering such livestock.

SUMMARY

One of the objectives of the present invention is therefore to propose improvements to the facility proposed in this prior document.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 attached illustrates the contents of a facility according to the aforementioned prior document WO2019097142.

FIG. 2 is a partial schematic view of a facility suitable for implementing the present invention.

DETAILED DESCRIPTION OF PREFERRED EMBODIMENTS

The following elements are identified in this FIG. 1:

- an injector 61, for example a Venturi injector, for injecting a gas into water;
- a water inlet line ("WATER") and a gas inlet line ("GAS") arrive at this injector 61, the upstream end of this gas line being in this case connected to a store of oxygen (represented by a cylinder) or of a mixture of gases comprising oxygen, for example a mixture of 70% oxygen and 30% $CO_2$;
- a pressure-reducing valve 62;
- a regulating valve 63 (gas-regulating valve calibrated to inject a chosen amount of gas into the injector);
- a coil 64: the length of the coil determining a chosen gas/water contact time, preferentially of greater than 10 seconds, and more preferably between 10 and 30 seconds;
- a water circulation pump 65: the water pump ensuring high water speeds in the coil;
- a backpressure regulator 66;
- a float valve 67;
- a tank of water at atmospheric pressure (68).

This previously proposed facility has already proven successful in limiting capital costs, since it avoids the (expensive) use of an oxygen analyzer.

The "WATER" line arriving from the right supplies the bath with "fresh" or new water, thus enabling the tank to be first filled with water before starting; the float valve 67 (for example of the WC water flush type) makes it possible to maintain a constant water level in the tank.

The use of a tank of water at atmospheric pressure simultaneously maintains a low pressure to the watering network and a high pressure in the coil in order to dissolve the oxygen.

The backpressure regulator always maintains the same pressure in the circuit whatever the water consumption.

The oxygen injection system operates when the watering network is supplied with water; in the event of stoppage, the system is shut off.

A "suction water" line leaves from the reservoir and conveys water from the reservoir to the injector; it is thus a mixture of recycled water and of fresh water. In other words, except when the animals are not consuming water, the injector receives 100% recycled water (remember that the animals always consume water; to stop them, the light has to be turned off).

The water can be directed, via the pump 65 and the dissolution coil 64, to the watering zone, passing outside the tank 68, as will have been understood, and through the backpressure regulator 66. The backpressure regulator is also located outside the bath, but the backpressure regulator may be positioned in the water of the tank for reasons of space/fit.

As shown in the figure, the facility enables, if necessary, a part of the water coming from the coil to flow into the tank and the other part to flow into the watering zone.

The improvements proposed by the present invention are explained below with reference to the attached FIG. 2.

The attached FIG. 2 provides a partial schematic view of a facility suitable for implementing the present invention and will allow the technical proposal of the invention to be better understood by means of the following.

The nomenclature of the elements in FIG. 2 is as follows:

1: gas cylinder

2: gas pressure-reducing valve (expanding the gas at a pressure higher than the pressure of the water network)

3: suction-side flowmeter (for regulating the oxygen flow on the suction side of the pump 9)

4: discharge-side flowmeter (for regulating the oxygen flow on the discharge side of the pump 9)

5: suction-side solenoid valve (controlled by activation of the pump and by a flow sensor)

6: discharge-side solenoid valve (controlled by activation of the pump and by flow sensor and by level switch with time delay)

7: suction-side Venturi (for injecting gas at a low flow rate into the water on the suction side of the pump without causing cavitation)

8: discharge-side Venturi (for injecting gas into the water on the discharge side of the pump, at the flow rate corresponding to the water supplementing the suction flow)

9: pump (for increasing the pressure of the water and creating a water flow, preferably between 1 m/s and 2.5 m/s)

10: coil (for dissolving the oxygen in the water, with a water flow rate preferably between 1 m/s and 2.5 m/s and a contact time preferably between 10 and 20 seconds

11: water inlet solenoid valve (for maintaining the water level in the tank and activating the oxygen injection by actuating the reference sign 6)

12: backpressure regulator (for maintaining the water flow rate and therefore the speed in the coil, thereby supplying the desired outlet pressure to the user site)

13: solenoid valve (normally open (NO), for bypassing the system if the pump or control system stops, thereby ensuring that the animals always have water)

14: level switch (for managing the water level in the tank and triggering the high-flow oxygen injection, reference sign 6)

15: water flow regulator, regulating the inlet flow of new water

16: filter

17: water tank

20: fresh water inlet

30: recirculation/bypass

40: water network at the farm

50: watering stations (nipples)

The present invention therefore proposes performing TWO simultaneous injections of oxygen or of a mixture containing oxygen:

one upstream of the pump; and the other downstream of the pump;

the flow rate of the injection performed upstream being lower than the flow rate performed downstream of the pump.

The flow rate of gas injected upstream preferably represents between 5% and 25% of the saturation point of pure oxygen in water under the considered conditions, 25% being considered the limit which can cause cavitation, while the flow rate downstream of the pump represents the amount required to supplement the first injection to reach the desired total content value.

Example flow rates are set out below to help explain the foregoing.

Clear water is saturated with pure oxygen (Henry's law) at 43.4 mg/l at 20° C.

The objective is considered to be to incorporate the maximum amount of oxygen on the suction side of the pump, for example 25% of 43.4, i.e. 10.85 mg/l.

To reach a total of 35 mg/l in the watering water, for example, the following is required:

35 less 10.85 less the natural oxygen content present in the water (9.2 mg/l under the previous conditions (20° C.)), i.e. 14.95 mg/l.

This figure is adjusted by the efficiency of the oxygenation equipment, which is conventionally considered to be close to 80%.

The result is $(14.95\times1.2)=17.94$ mg/l to be added on the discharge side of the pump.

As will be clear to a person skilled in the art, an injection upstream of the pump is efficient and beneficial because the injected gas is more "divided" and therefore more dissolved. However, since said injection can cause cavitation of the pump, the flow rate thereof must be limited. It is therefore proposed to perform an injection at a low flow rate upstream of the pump (suction), supplemented by an injection at a higher flow rate downstream of the pump (discharge), thereby achieving the desired total flow rate value (content).

And as will be clear to a person skilled in the art, one of the additional advantages of this configuration is that when the facility turns back on itself via the bypass, this small injection at the suction side can be maintained, and if the animals consume water, the level in the tank drops, leading to the injection of oxygen at a higher flow rate on the discharge side.

It should also be noted that this configuration of injections also enables oxygen to be injected from various sources, and in particular from an autonomous (on-site) production source such as oxygen "concentrators", well known and used in the medical field (supplying patients with oxygen-enriched air).

Since the flow rate on the suction side of the pump installed according to the invention is relatively low, this concentrator technology is very well suited to provide such a supply.

Furthermore, one or all of the following embodiments may also be used according to the invention:

The operation of the pump is linked to the light level in the building where the animals are housed. Indeed, animals are known to stop feeding and drinking during the night, when the light is off.

It is therefore extremely advantageous to stop the injection of oxygen at night and stop the continuous flow of water to the animals:

This reduces power consumption; and

The fact that the water is not heated overnight keeps it palatable in the morning, which is not the case when the water circulates continuously in the pump without fresh water being added.

In short, animals stop drinking and feeding at night, so it is crucial to stop the pump, to prevent the water from heating up.

However, as mentioned above, the bypass 30 maintains the pressure of the circuit even though the pump is stopped, watering the animals at night in case an animal wishes to drink at night from the nipples 50, in which case the water is not oxygen-enriched.

The oxygen injection is linked to the fresh water inlet (via a solenoid valve, 11 in FIG. 2). This embodiment clearly reduces oxygen consumption compared to the prior art, in which oxygen is injected continuously.

An adjustable time delay is applied to the oxygen injection (injections) to prolong this injection for a desired period of time after the fresh water input is stopped. This optimizes the dissolved oxygen value.

By way of illustration, the time delay can be calculated using the principle of replacement(s) of the volume of water in the facility, between 1 and 2 replacements.

For example, a facility that contains 600 liters of water (0.6 $m^3$) equipped with a pump running at 3 $m^3$/h has a replacement time of 12 minutes.

The time delay will then advantageously be set to between 12 and 24 minutes.

The present invention therefore relates to a facility for rearing animals and in particular poultry and pigs, comprising means for conveying water to the animals for their watering, said conveying means comprising:

an injector for injecting a gas into water;

a water inlet line and a gas inlet line arriving in the injector;

a source of oxygen or of a gas mixture comprising oxygen, for example an oxygen store capable of delivering oxygen into the gas line, a tank of water at atmospheric pressure, the injector being supplied with water from the water in this tank, wherein said tank can furthermore be supplied with new water;

a coil capable of receiving water charged with dissolved oxygen coming from the injector, wherein said water arrives at the coil by virtue of a pump, and said coil creates a water/oxygen contact time;

the water coming out of the coil passing through a device such as a backpressure regulator so that it can be directed in full to the watering zone or else partly to the watering zone and partly to the tank, characterized in that the facility comprises means for performing two simultaneous injections of oxygen or of a mixture containing oxygen into the water, one upstream of the pump and the other downstream of the pump, the flow rate of the injection performed upstream being lower than the flow rate performed downstream of the pump.

According to one of the embodiments of the invention, said source is an oxygen concentrator supplying oxygen-enriched air.

The invention also relates to a method of conveying watering water to livestock, characterized in that the water is conveyed to the animals by means of a facility as described above.

According to one of the embodiments of the method according to the invention, the flow rate of gas injected upstream represents between 5% and 25% of the saturation point of pure oxygen in water under the considered temperature conditions at the farm, while the flow rate downstream of the pump represents the amount required to supplement the first injection to reach the desired value for a total oxygen content in the water supplied to the animals.

According to one of the embodiments of the method according to the invention, the operation of the pump is linked to the light level in the building where the animals are housed.

According to one of the embodiments of the method according to the invention, the injection of the gas is linked to the fresh water inlet in the facility.

According to one of the embodiments of the method according to the invention, an adjustable time delay is applied to the gas injection to prolong this injection for a desired period of time after the fresh water input in the facility is stopped.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

The singular forms "a", "an" and "the" include plural referents, unless the context clearly dictates otherwise.

"About" or "around" or "approximately" in the text or in a claim means ±10% of the value stated.

As used herein, "room temperature" in the text or in a claim means from approximately 20° C. to approximately 30° C.

The term "ambient temperature" refers to an environment temperature approximately 20° C. to approximately 30° C.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

The invention claimed is:

1. A facility for rearing animals, including for conveying water to the animals for their watering, the facility comprising:

an injector (7, 8) configured to inject a gas into water;

a water inlet line (20) and a gas inlet line (3, 4, 5, 6) arriving in the injector;

a source (1) of oxygen or of a gas mixture comprising oxygen, capable of delivering oxygen into the gas inlet line, a tank (17) of water at atmospheric pressure, the injector being supplied with water from the water in the tank, wherein the tank is furthermore supplied with new water (20);

a coil (10) capable of receiving water charged with dissolved oxygen coming from the injector, wherein the water arrives at the coil by virtue of a pump (9), and the coil creates a water/oxygen contact time;

the water coming out of the coil passing through a device so that it is directed in full to the watering zone or else partly to the watering zone and partly to the tank (17), wherein the facility performs two simultaneous injections of oxygen or of a mixture containing oxygen into the water, one (3, 5, 7) upstream of the pump and the other (4, 6, 8) downstream of the pump (9), the flow rate of the injection performed upstream being lower than the flow rate performed downstream of the pump.

2. The facility as claimed in claim 1, wherein the source is an oxygen concentrator supplying oxygen-enriched air.

3. The facility as claimed in claim 1, wherein the device is a backpressure regulator (12).

4. A method of conveying watering water to livestock, wherein the water is conveyed to the animals by means of the facility as claimed in claim 1.

5. The method as claimed in claim 4, wherein the flow rate of gas injected upstream of the pump represents between 5% and 25% of the saturation point of pure oxygen in water under considered temperature conditions at a farm, while the flow rate downstream of the pump represents the amount required to supplement the first injection to the coil to reach a desired value for a total oxygen content in the water supplied to the animals.

6. The method as claimed in claim 4, wherein an operation of the pump is linked to a light in a building where the animals are housed.

7. The method as claimed in claim 4, wherein the injection of the gas is linked to a fresh water inlet in the facility.

8. The method as claimed in claim 4, wherein an adjustable time delay is applied to the gas injection to prolong the injection for a desired period of time after a fresh water input in the facility is stopped.

* * * * *